United States Patent [19]
Wassam et al.

[11] Patent Number: 4,739,692
[45] Date of Patent: Apr. 26, 1988

[54] LIQUID CONTRACTILITY ACTUATOR

[75] Inventors: Richard L. Wassam, San Francisco; Lonner O. Ralston, Sausalito; Andrew L. Solow, San Francisco, all of Calif.

[73] Assignee: Fluidic Motion Corporation, San Francisco, Calif.

[21] Appl. No.: 866,743

[22] Filed: May 27, 1986

Related U.S. Application Data

[63] Continuation-in-part of Ser. No. 614,548, May 29, 1984, abandoned.

[51] Int. Cl.⁴ .............................................. F15B 21/02
[52] U.S. Cl. ......................................... 91/36; 91/454; 91/530; 92/48; 92/92; 901/21; 901/22; 901/29
[58] Field of Search ................... 92/48, 90, 91, 92; 91/36, 530, 454, 457; 901/21, 22, 28, 29

[56] References Cited
U.S. PATENT DOCUMENTS

| | | | |
|---|---|---|---|
| 2,483,088 | 9/1949 | DeHaven | 92/90 X |
| 2,844,126 | 7/1958 | Gaylord | 92/90 |
| 4,356,554 | 10/1982 | Susnjara et al. | 901/22 X |
| 4,369,814 | 1/1983 | Humphrey | 901/28 X |
| 4,379,335 | 4/1983 | Kirsch et al. | 901/22 X |
| 4,494,417 | 1/1985 | Larson et al. | 901/22 X |
| 4,615,260 | 10/1986 | Takagi et al. | 92/92 |

FOREIGN PATENT DOCUMENTS

| | | | |
|---|---|---|---|
| 422580 | 9/1974 | U.S.S.R. | 901/22 |
| 837845 | 6/1981 | U.S.S.R. | 901/22 |

*Primary Examiner*—Robert E. Garrett
*Assistant Examiner*—Mark A. Williamson
*Attorney, Agent, or Firm*—David E. Newhouse

[57] ABSTRACT

A contractility actuator includes a longitudinal quadrilateral mesh of relatively inelastic segments with anchor points at either end, an expandable bladder confined within the mesh and means for introducing and inflating the bladder with a liquid for generating a contractile force between the anchor points mechanically analogous to a muscle but of much greater magnitude. Two or more of the contractile actuators are arranged in a system for precisely articulating one or more arms pivotally secured at the distal ends of a structural member.

25 Claims, 11 Drawing Sheets

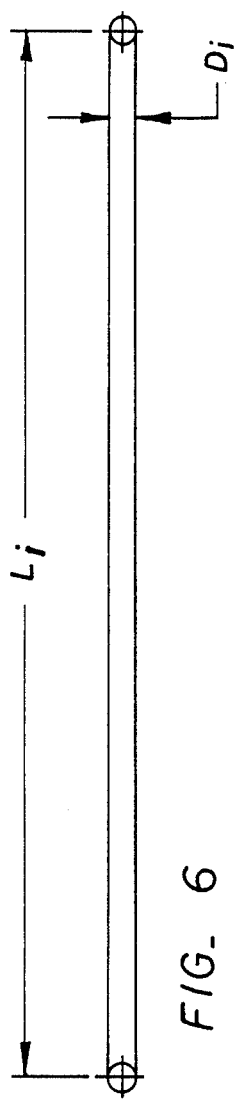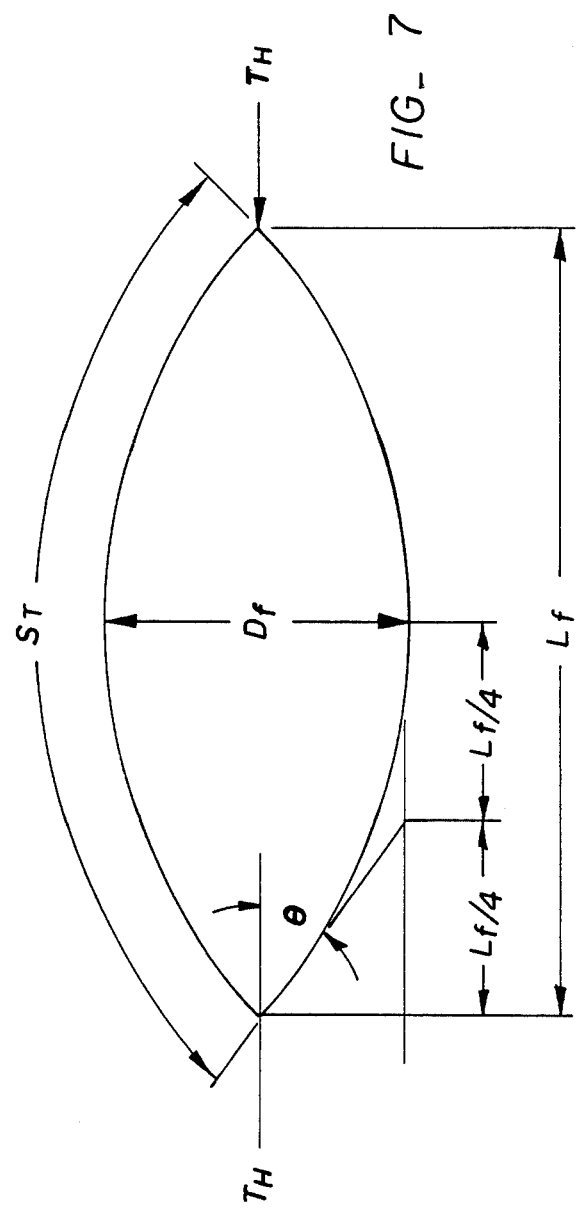

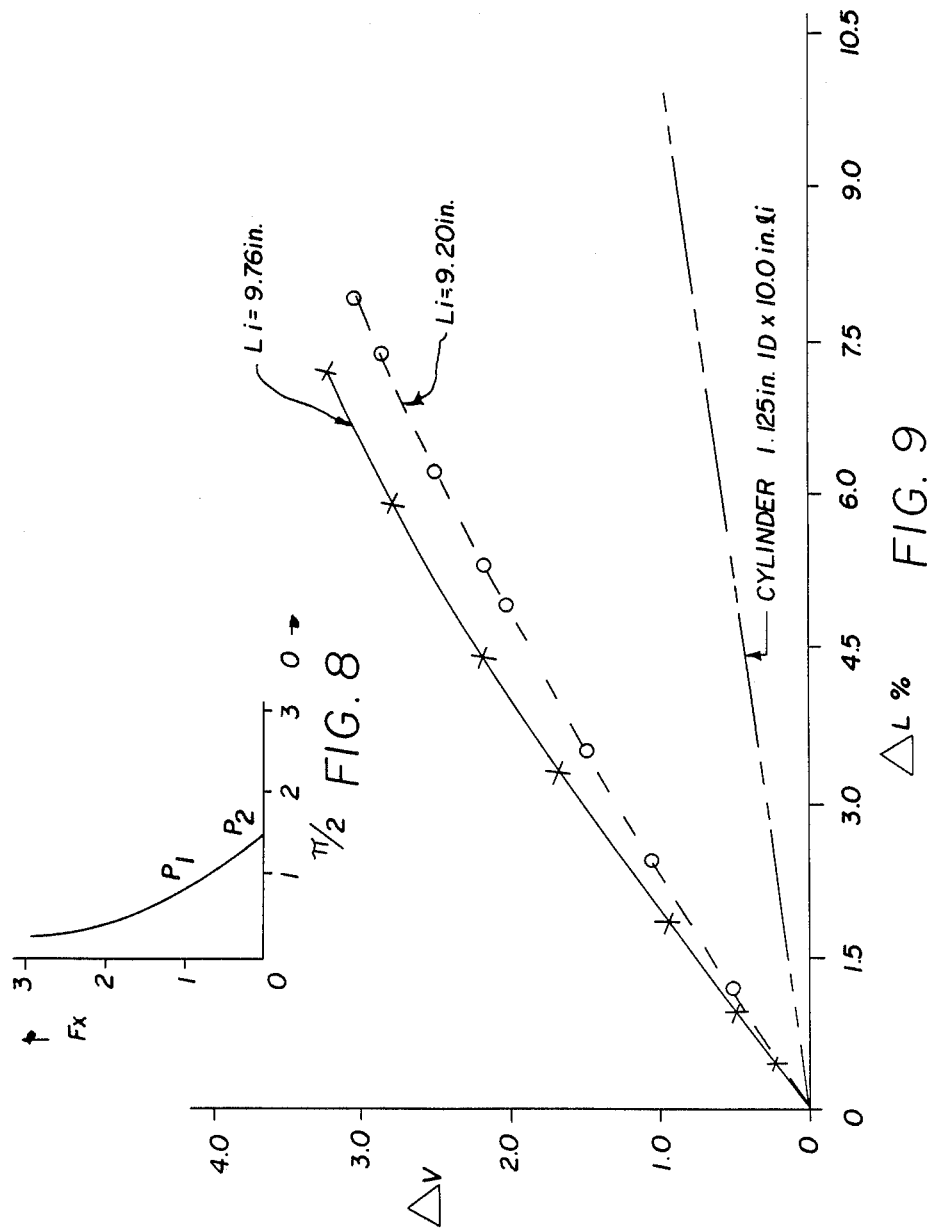

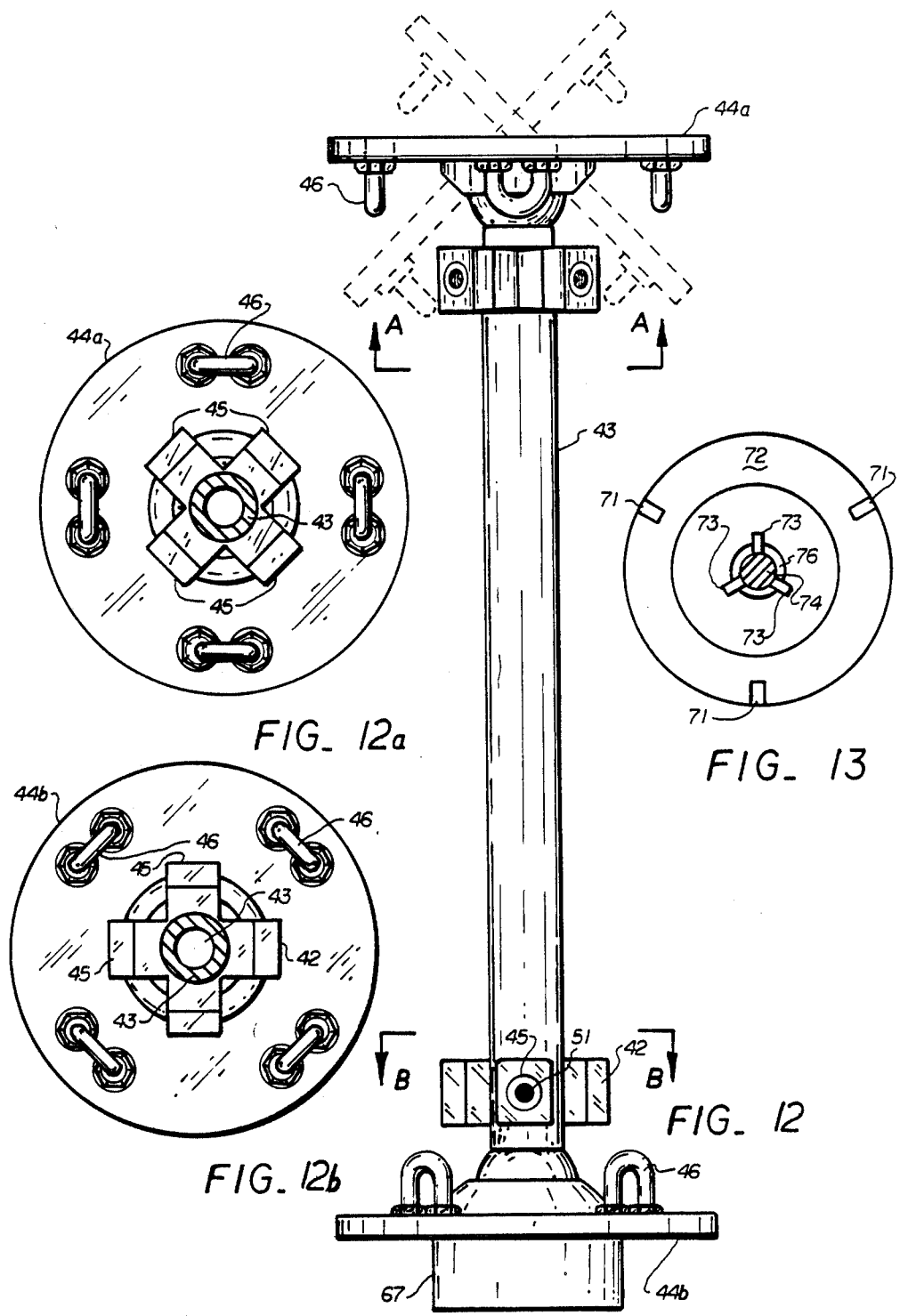

LIQUID CONTRACTILITY ACTUATOR

RELATED APPLICATIONS

This application is a continuation-in-part of patent application Ser. No. 614,548 filed 05/29/84 entitled "FLUIDIC CONTRACTILITY TRANSDUCER", now abandoned.

BACKGROUND OF THE INVENTION

1. Field of the Invention

The invention relates to mechanisms of contractility, and to systems utilizing "McKibben" muscles.

2. Description of the Prior Art

Contractility describes the fundamental mechanism by which motion or movement is accomplished by living matter. Contractility is thought to result from the interaction of various fibrillar (contractile) proteins within the living cell. The contractile properties of such proteins are thought to primarily result from chemical interactions. Accordingly, investigations of the contractile properties of muscle cells primarily focus on the chemical aspects (reactions), rather than the mechanical aspects of contraction.

It is generally believed that two types of filament structures form the contractile machine in a muscle, ie, a "thick" filament composed primarily of myosin and a "thin" filament which contains actin. It has been discovered that the filaments, whether thick or thin, do not change in length as a muscle cell contracts from its relaxed state. It is also known that "thin" filaments are attached at either end of the muscle cell and that the "thick" filaments bind to the "thin" filaments. It has been hypothesized that the "thin" filaments mechanically slide by the "thick" filaments.

The magnitude of the change in the overall length of the muscle cell during contraction is typically less than 3 microns. In fact the sarcomere length of some skeletal muscles is only about 2.5 microns indicating that such skeletal muscles do not signifigantly shorten during contraction.

Summarizing, muscle cells and muscles have the capability of producing very large forces upon contraction. Muscles also tend to increase in diameter as they contract. However, the mechanical aspects of the contractility mechanism of a muscle cell are not well understood.

Mechanical systems simulating the action of a muscle described in the literature typically include an expandable bladder confined and/or constrained to expand radially when pressurized with a gas. For example, a Brevet D' Invention published Oct. 15, 1971 in the Republic of France, No. 2.076.768 describes a device for converting fluid pressure into contractile force and includes an ovoidal rubber envelope reinforced with relatively inelastic longitudinal filaments. The ends of the ovoidal envelope are anchored between two points and the envelope pressurized with a gaseous fluid causing the ovoidal envelope to expand diametrically and contract longitudinally pulling the anchor points together. Similarly, U.S. Pat. No. 3,645,173, Yarlott, describes an ovoidal envelope defined by an expandable bladder confined within relatively inelastic longitudinal strands such that the bladder can expand diametrically but not longitudinally when pressurized with a gaseous fluid.

The earliest known mechanical system which simulated the action of a muscle known as the "McKibben Synthetic Muscle" comprises a cylindrical sheath woven from helical strands of an inelastic material surrounding a gas inflatable bladder, and was designed to articulate orthopedic and prosthetic appliances for polio victims.

While gas has advantages as a medium for pressurizing and expanding "McKibben" type contractile actuators or muscles, its primary disadvantage is that it is compressible which dictates an "elastic" contractile response. Elastic contractile responses are not always desirable. For example, an elastic contractile mechanism can not establish or maintain a reference position where load varies.

Also, as explained infra, the contractile force generated by a "McKibben" type contractile device as it inflates is not linear, and when a gas is utilized to inflate or "energize" the muscle, the contractile position of the muscle will vary with gas pressure and tensile load. Accordingly, any system utilizing gas inflatable "McKibben" type contractile devices requires compelx electromechanical or other type of servomechanisms both for adjusting position, and for metering the gas for inflating and deflating under conditions of varying pressure.

Still another significant disadvantage of using a gas for inflating and contracting a "McKibben" muscle relates to the property of gas to expand filling the available volume. This means that the degree of contraction (or extension) of the muscle is determined by the tensile force between the anchor points of the muscle resisting contraction.

The above reasons, among others have discouraged commercial acceptance of the "McKibben" muscle as a contractile force generating mechanism/actuator.

Summarizing, gas energized contractile force mechanisms have three variables, position (volume), pressure and tension. Temperature also affects the response of such gas energized systems. For the "McKibben" type contractile force mechanisms to achieve commercial acceptance, it is necessary to eliminate or minimize the above variable affecting its response.

SUMMARY OF THE INVENTION

A contractility actuator is described which includes a cylindrical array formed by a network of open two dimensional quadrilateral segments, and expandable bladder located within the cylindrical network and means introducing and expanding the bladder with a liquid for generating a very large magnitude contractile force aligned with the axis of the array. Two or more of the described contractility actuators may be arranged in a system for precisely articulating one or more arms pivotally secured at the distal end of a ridged structure.

The principal aspect of the invented contractility actuator relates to the incompressible properties of liquids which reduces the number of variables allowing the actuator to precisely respond relative to both position and tension. Accordingly, two or more such actuators working in opposition across a fulcrum establish a dynamic equilibrium which can be incrementally altered by simultaneously inputting liquid into actuators on one side of the fulcrum and allowing liquid to exhaust from the actuators on the other side of the fulcrum to establish a new dynamic equilibrium position without oscillation.

Another aspect of the invention relates to utilization of a combination of liquid and gas inflated contractility actuators for pivoting arms at the distal ends of structure members providing a combination of the elastic positional response characteristics of a gas inflated contractility actuator with the positional precision and accuracy characteristics of the liquid energized contractility actuator.

Still other aspects, features and objects of the present invention involve both methods and apparatus for controlling a plurality of such contractility actuators for articulating an arm in a solid angle in about a pivot point.

Still other advantages, objects, features and aspects of the invented liquid energized contractility actuators and systems utilizing such actuators are more fully described and will become apparent with reference to the following descriptions and drawings of preferred and exemplary embodiments of both the actuator and of systems utilizing the invented actuator.

DESCRIPTION OF THE DRAWINGS

FIG. 6 is a schematic illustrating a "McKibben" actuator in a relaxed configuration.

FIG. 7 is a schematic illustrating a "McKibben" contractility actuator in a contracted configuration.

FIG. 8 is a graph illustrating the cotangent dependency of the contractile force generated by "McKibben" type contractility actuators.

FIG. 9 is a graph illustrating the change in length as a function as a change in volume for a "McKibben" type contractile mechanism and for a piston-cylinder contractile mechanism.

FIGS. 12, 12a, and 12b illustrate the features of the embodiment of the arm and platform shown in FIG. 10.

FIG. 13 illustrates the essential features of another embodiment for the arm and platforms of FIG. 10.

DESCRIPTION OF THE PREFERRED AND EXEMPLARY EMBODIMENTS

Figure 1:
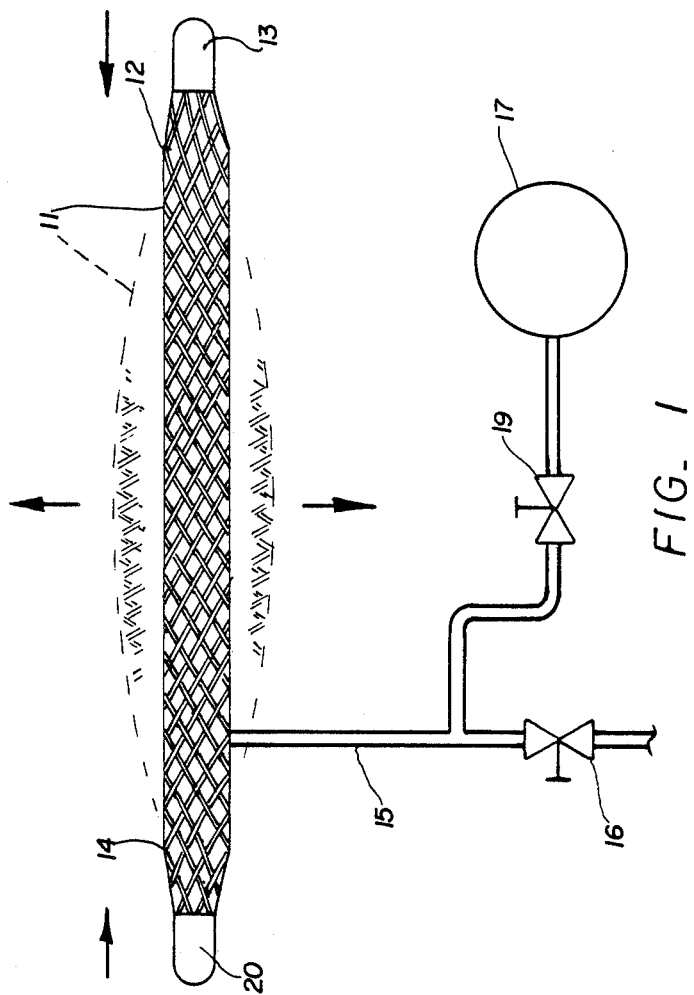
FIG. 1 illustrates the essential components of a "McKibben" type contractility mechanism.

As shown in FIG. 1 the basic "McKibben" type fluid contractile actuator includes a cylindrical sheath 11 formed from a flexible mesh 12 secured to connectors 13 at either end of the sheath 11. A bladder 14 composed of a strong expandable material is disposed within the sheath 11. Connected to the bladder is an inflation line 16 through which a pressurizing fluid 17 may be introduced for purpose of expanding the bladder 14 within the cylindrical sheath 11. Appropriate valves 18 on the inflation line 16 direct fluid from a pressurizing source 17 into the bladder for inflation (contraction) and allow fluid to escape from the bladder for deflation (extension).

In operation, the "McKibben" type fluidic contractility actuator or "muscle" is connected between two fixed points using connector 13 with the bladder 14 deflated. Ideally the cylindrical sheath formed from the flexible mesh when connected between two flexible points should experience a very slight tensile stress in order to ensure that the sheath 11 when connected in its extended "relaxed" position between the two points is at a minimum diameter. The inflation line 16 is then connected to the source of pressurizing fluid 17. The fluid may be compressible, i.e., a gas, or incompressible, i.e., a liquid. The fluid when introduced into the bladder 14 expands it against the enclosing mesh sheath 11 causing it to expand diametrically and contract longitudinally generating an extremely large contractile force between the connectors 13.

Figure 2:
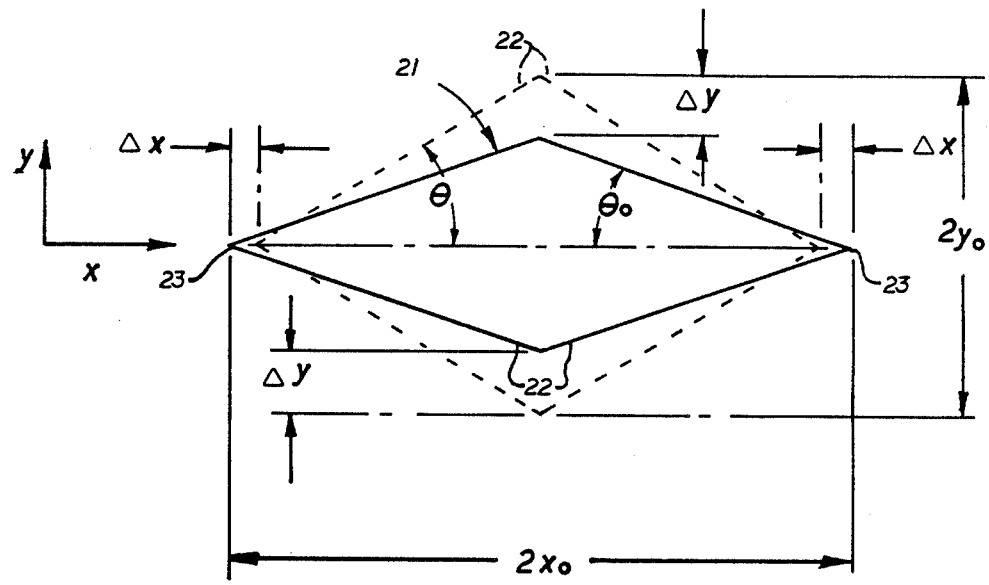
FIG. 2 is a schematic of a rhombus responding to an impressed force for illustrating an aspect of "McKibben" type contractility actuators.

The two dimensional diagram of FIG. 2 illustrates the basic principles of a "McKibben" muscle. In particular, a rhombus 21 is defined by four inextensible segments or rods 22 each having a length L. The ends of the segments 22 are pivotally secured together allowing the adjacent segments to rotate relative to one another. In the extended position, the rhombus 21 has an initial half angle $\theta_o$ between the respective segments as shown. If a force is impressed in the vertical direction (along the Y-axis) the rhombus 21 is disturbed increasing its diagonal width along the Y axis and decreasing its diagonal width along the X axis according to a differential relationship:

$$dx = dy \cotan \theta;$$

where $\theta$ is the half angle of the disturbed rhombus (shown in phantom in FIG. 2).

Figure 3:
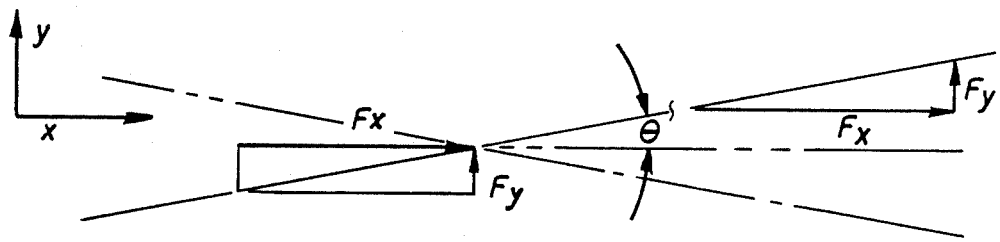
FIG. 3 is a simple vector diagram for illustrating the relative magnitude of the respective forces with respect to an ideal rhombus.

As illustrated in FIG. 2, the pivot points 23 between the segments 22 of the rhombus are not fixed. Now assume that the pivot points 23 lying along the X-axis of FIG. 2 are fixed, and using vector analysis, the magnitude of the contractile force between those two pivot points resulting when a force is impressed in the Y direction can be determined. In particular referring to FIGS. 2 & 3, a relatively small magnitude force $F_y$ along the Y-axis can generate a relatively large magnitude contractile force $F_x$ along the X-axis between the fixed pivot points of the rhombus 21, particularly for small half-angles $\theta$. The ratio of the contractile force along the X axis, $F_x$ to that of the force impressed in the Y direction, $F_y$ varies as a cotangent of the half angle $\theta$ between the connected segments 22, i.e.;

$$F_x = F_y \cotan \theta$$

FIG. 8 illustrates the magnitude of the force magnification factor as the half angle $\theta$ approaches 0.

Figure 4:
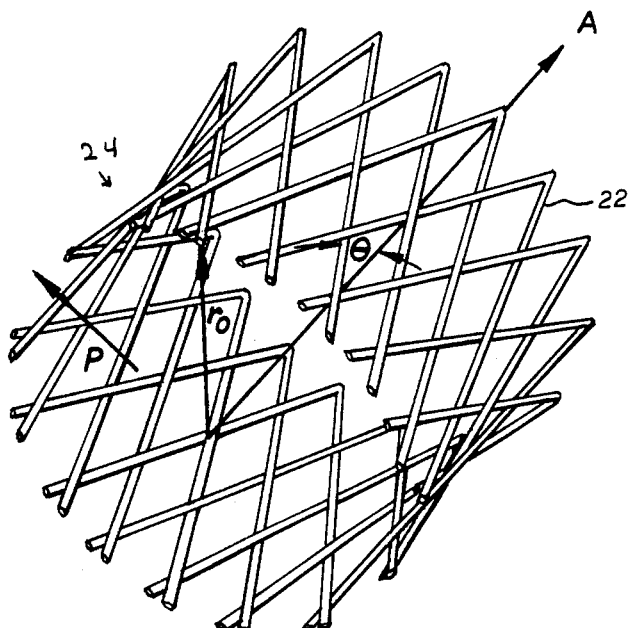
FIG. 4 is a perspective schematic illustrating a cylindrical segment of a "McKibben" type contractility actuator.

Now consider a three-dimensional connected network of rhombi 21 in the form of right cylinder 24, a segment of which is illustrated in FIG. 4. Each rhombus 21 is formed of four inextensible segments 22 pivotally coupled together at their respective ends. The inextensible segments 22 of the rhombi laterally combined to form a mesh of the inextensible helical cords which terminate at the respective ends of the cylindrical sheath formed by the rhombi. Similarly, the sum of the respective diagonal widths of the rhombi along the Y axis will equal the circumference of the cylindrical sheath and the sum of the diagonal length of the rhombi along the X axis will equal the length of the cylindrical sheath. More generally, the right cylinder of FIG. 4 can be supplanted by a general array formed by a connected network of rhombi or other quadrilaterals as shown in FIG. 5.

Figure 5:
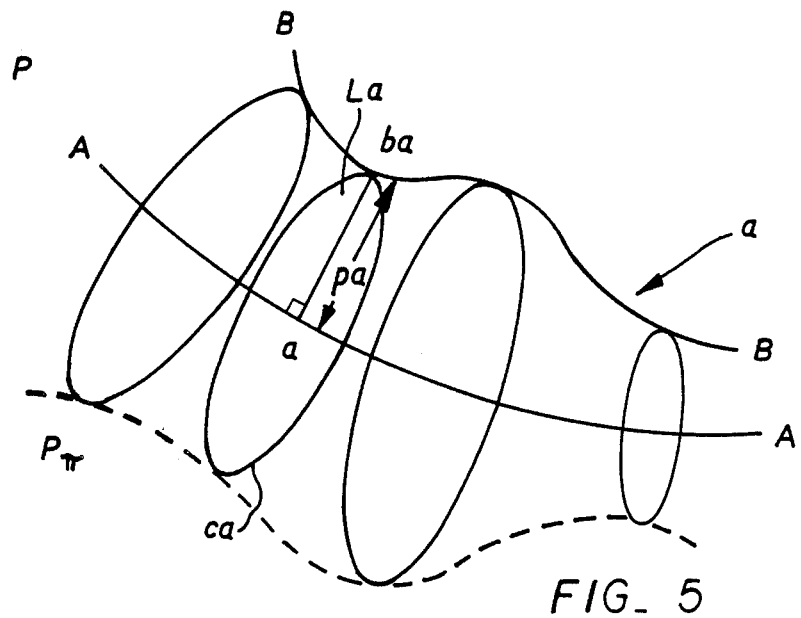
FIG. 5 illustrates the constructor of a general conical array beginning with a cone axis line AA and a cone generation line BB line in a plane.

In particular, as shown in FIG. 5, two smooth curvilinear lines AA and BB lie in substantially in a plane P. Assuming that the lines AA and BB do not intersect, then line AA can be designated as an axis and the line BB can be connoted the generator of a conical array. For each point on line AA construct a line segment $L_a$ perpendicular to AA within the plane P. The line segment $L_a$ terminates at its intersection with the generator line BB at a point $B_a$, distance $P_a$ from point a on the axis line AA. Now rotate the line segment $L_a$ about the point a in a plane containing it and perpendicular to the plane P. The locus of the end points of the rotated line segment $L_a$ defines a circle $C_a$ with its center at a and having a radius $P_a$. The locus of points $C_a$ for all points a on the axis AA defines a general conical array which is a 2-dimensional surface that includes most or all of the cone generator BB for a.

For any point, a on AA, the circle $C_A$ is called a circumference line for the array. It should be appreciated that utilizing generally descriptive terms for describing the sheath 11 enclosing the bladder 14 allows for mathematical analysis of changes in configuration of the rhomboidal array as the sheath expands.

In particular, referring now to FIGS. 6 and 7, a general conical array 26 is shown in a relaxed or collapsed configuration (FIG. 6), and in a contracted or inflated configuration (FIG. 7). With reference to the diagrams presented in FIGS. 6 and 7, the following definitions may be utilized for the purpose of gaining an analytical insight as to how a "McKibben" muscle operates:

$S_t$ is the parabolic length of the conical array;
$L_i$ is the relaxed length of the actuator between the termination points;
$L_f$ is a contracted length of the actuator between the termination points;
$D_f$ is the maximum diameter of the array in the contracted position;
$D_i$ is the minimal diameter of the conical array in the relaxed configuration;
$V_f$ is the internal volume of the conical array in the contracted configuration;
$V_i$ is the internal volume of the conical array in the relaxed configuration;
$T_H$ is the horizontal tension along the axis of the conical array;
P is the fluid pressure within the bladder;
D is the average diameter assumed equal to $\frac{2}{3}$ $(D_i+D_f)$; and
R equals $(D_f-D_i)/L_f$.

(The horizontal force component due to pressurization of the bladder within the general conical array is assumed to be 0 predicted on an assumption of symmetry.)

Based on the above assumptions and definitions, the following equations approximately describe the response of a "McKibben" muscle assuming that the material composing the general conical array is inextensible:

$$S_t = L_i = L_f[1+(\tfrac{2}{3})R^2-(2/5)R^4+(4/7)R^6-\ldots];\quad \text{(eq.1)}$$

$$V_f = (\pi/15)L_f[2D^2_f+V_fD_i+(\tfrac{2}{3})D^2_i];\quad \text{(eq. 2)}$$

$$V_i = (\pi/4)D^2_iL_i;\quad \text{(eq.3)}$$

$$T=(\pi/6)(PL_f^2)[(D_i+D_f)/D_f-D_i]=(\pi/2)PDL_f(\cotan\theta);\quad \text{(eq.4)}$$

$$L_f=[1-(\cosarcsin(D_i/2)-\cosarcsin(D_f/2))]^{\frac{1}{2}}[L_i];\quad \text{(eq.5)}$$

The above equations illustrate the magnitude of the horizontal contractile tensile force that can be generated by a "McKibben Muscle." For example, from equation 4 it can be seen that the contractile force component due to the pressurizing fluid theoretically increases asymptotically approaching infinity as $\theta$ approaches 0. (See the graph of FIG. 8.)

The graph presented in FIG. 9 plots the change in length of a McKibben Muscle, $\Delta L$, along the horizontal axis for a corresponding change in volume, $\Delta V$, along the vertical axis based upon the relationship obtained using a $\frac{5}{8}$ in. HD EXPANDO cylindrical helical weave sheath manufactured by Bently Harris Corporation.

The solid line presents data points for a sheath having a initial length $L_i$ of 9.76 in. The dashed line presents data points for a sheath having a initial length $L_i$ of 9.20 in. The third line presents the same data for a cylinder having an internal diameter of 1.125 in. and an initial length $L_i$ of 10 in.

From FIG. 9, it can be seen that for that particular "McKibben Muscle", the ratio of the rate of change in length of the rate of change of volume, $\Delta L/\Delta V$, is substantial less than the same ratio for a comparable cylinder (by a factor of 4).

It can also be observed from the relationships expressed in equations 1-5 and from the graphs of FIGS. 8 and 9 that the spring constant of a "McKibben Muscle" has a significant dependance on the nature of the fluid inflating the bladder 14. In particular, where a gas is utilized to inflate the internal bladder 14, a "McKibben Muscle" is highly elastic with a correspondingly low spring constant since a gas is compressible, and accordingly does not have the capacity to maintain a reference position under conditions of varying load. However, using an incompressible fluid or a liquid to inflate the internal bladder 14 converts the "McKibben Muscle" into an inelastic contractile mechanism having a correspondingly high spring constant which accordingly has the capacity to establish and maintain a reference position under conditions of varying load in addition to capacity for generating contractile forces of very high magnitude.

Figure 10:
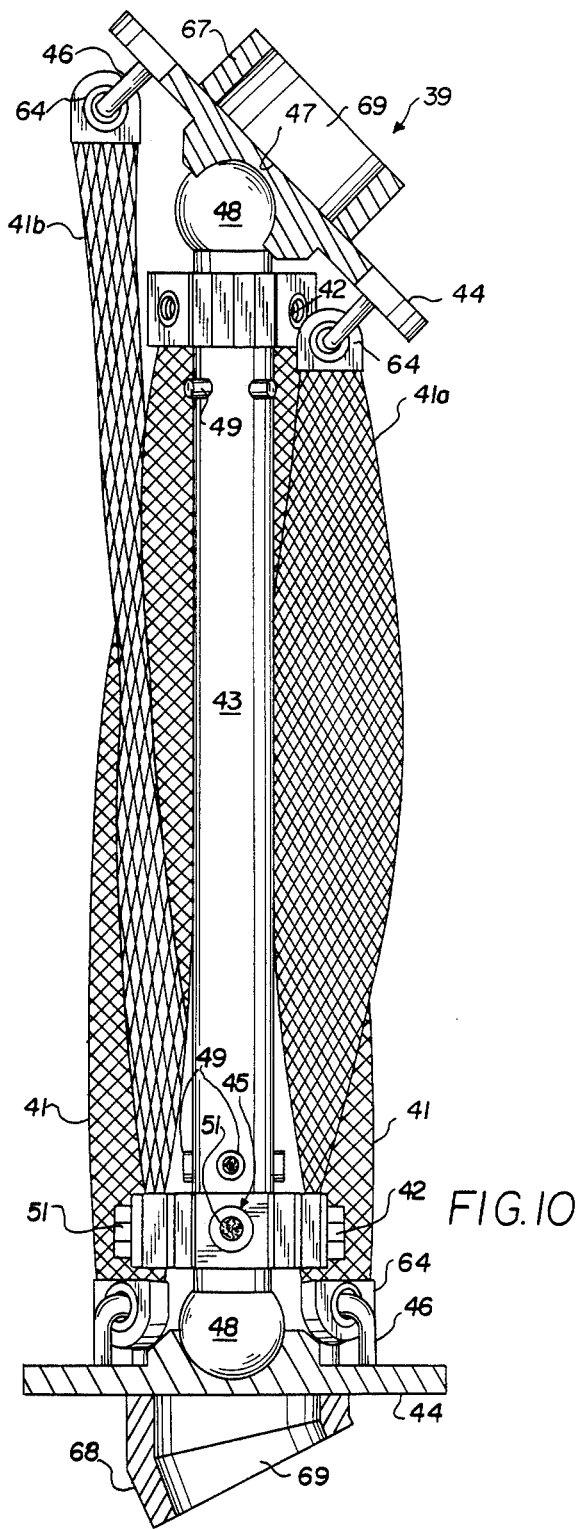
FIG. 10 is a partial cut-away illustration of a pivoting mechanism where invented liquid contractility actuators articulate platforms secured at either end of a longitudinal arm.

Turning now to FIG. 10, a pivoting mechanism 39 includes plurality of "McKibben" type contractile actuators 41 each with one end secured by a coupler 42 to a shank of a longitudinal arm 43 and its remaining end secured by an eyelet fastener 64 to an articulating platform 44 by U-bolts 46. The platforms 44 each include a hemispherical socket 47 receiving a spherical head at the distal ends of the arm 43. In the perspective illustrated, the contractile actuator 41A is contracted while contractile actuator 41B is extended. A contractile actuator is also secured between a coupling point 45 on the arm 43 and the platform 44 (not shown). Liquid is introduced into the respective contractile actuators 41 via inlet ports 49 which connect to conduits 50 (not shown) communicating through the interior of the arm 43 and up through a central shaft 51 at each coupling point 45 on the shank of the longitudinal arm 43.

Figure 11:
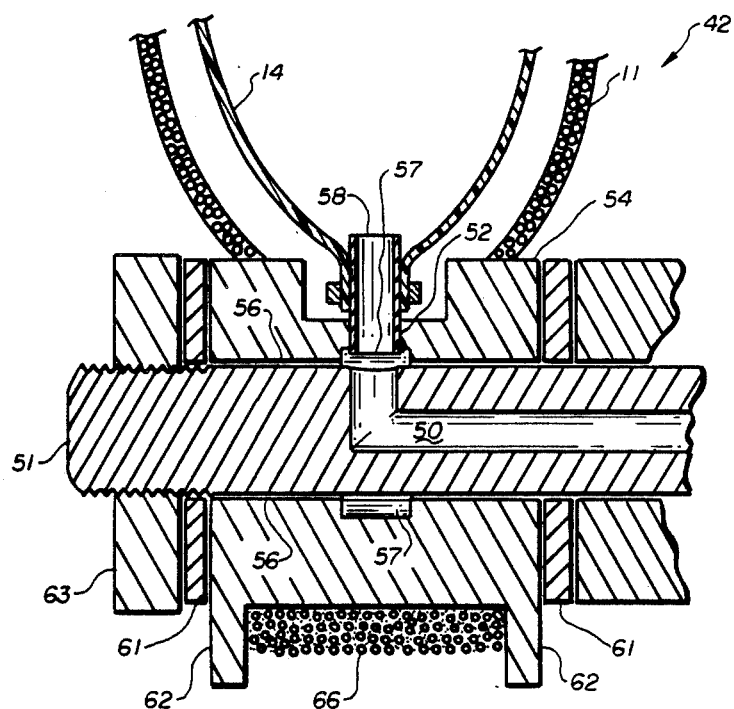
FIG. 11 is an enlarged cross section of the coupling securing one end of the contractility actuators to the shank of the longitudinal arm of the pivoting mechanism shown in FIG. 10.

In more detail, referring to FIG. 11 the coupler 42 includes a central housing 54 with cylindrical passageway 56 dimensioned to a receive the shaft 51 integrally extending out of the shank of the arm 43.

The liquid conduit 50 through the interior of the arm 43 and through the shaft 51 at each coupling point 45 communicates with an annular plenum 57 cut radially into the passageway 56. A threaded tube 58 forming the mouth of the bladder 14 screws into a threaded port 52 communicating through the housing 54 to the plenum 57. Liquid flows via the passageway 50 and plenum 57 and out the outlet port 52 for inflating or expanding the bladder 14. Suitable seals 61 are compressed between the annular shoulders 62 on either side of the housing 54 and a mounting nut 63 and a corresponding annular shoulder of the shaft 51. The mounting nut 63 and the shaft 15 are suitably threaded for compressing the seals 61 to render the coupling 42 liquid tight.

The mechanism illustrated in FIG. 11 for introducing liquid into bladders 14 for inflating the actuators 41 is exemplary. In fact, provided there is sufficient space between the quadrilateral segments forming the mesh sheath 11, the connection to the bladder 14 can be made through a nozzle communicating to the interior of the bladder extending centrally between the quadrilateral mesh segments forming the sheath.

In the preferred embodiment, again referring to FIG. 11, each strand 66 of the mesh sheath 11 forms a closed loop which encircles both the eyelet fastener 64 and the coupler 42 In this fashion, any limitation on the magnitude of the tensile load which can be born by the actuator 41 is determined by the strengths of the strands 66, the shaft 51 and the U-bolts 46. In fact, the primary criteria for selecting a mechanism or means for coupling the mesh sheath 11 to the eyelet fastener 64 and coupler 42 is that it must be able to withstand the maximum expected tensile load between the connection points of the actuator 41.

Figure 16:
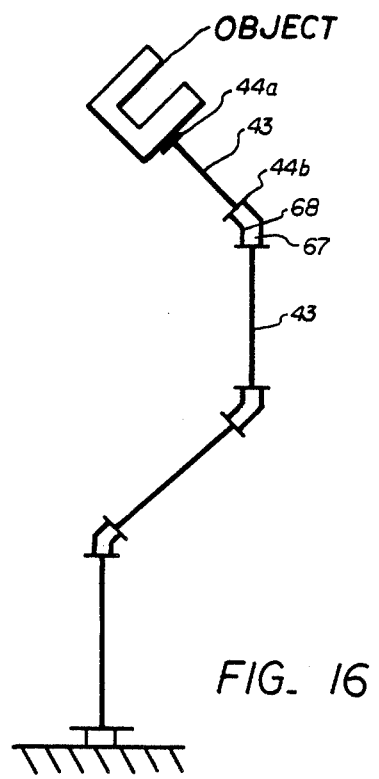
FIG. 16 presents a schematic diagram of a plurality of pivoting mechanisms of the type illustrated in FIG. 10.

Referring back to FIG. 10, the platform 44 pivoted by the actuators 41 about the spherical heads 48 at either end of the arm 43 each include connector means 67 (at the top) and 68 (at the bottom). The connectors 67 and 68 simply define receiving receptacles 69 for receiving correspondingly shaped male or female protrusions or receptacles (not shown) dimensioned to receive the connectors 67 & 68. Accordingly, the pivoting mechanism 39 can be secured to a stationary surface or the pivoting platform 44 of an adjacent pivoting mechanism 39. (See FIG. 16.) As illustrated, the connector 68 is inclined with respect to the longitudinal axis of the arm 43 to provide an additional dimension to the articulating range and capacity of a machine formed by two or more pivoting mechanisms 39.

The actuators 41 work in opposition as illustrated by actuators 41A and 41B (FIG. 10). Referring to FIGS. 12, 12A & 12B each arm 43 includes four (4) contractile actuators 41, for articulating the top platform 44A and four (4) for articulating the bottom platform 44B. The respective fastening positions of the actuators articulating the top platform 44, indicated by the U-bolts 46 in FIG. 12A, are rotated 45 degrees with respect to the coupling points 45 on the shank of the arm 43 of the actuators 41 articulating the bottom platform 44b. Similarly with reference to FIGS. 12B, the U-bolts 46 securing the eyelet fasteners 64 of the latter actuators 41 to the bottom platform are rotated at an angle of 45 degrees with respect to the coupling points 45 of the former actuators 41 articulating the upper platform 44A.

As illustrated in FIG. 12 the articulating mechanism formed by the combination of the arm 43, the platforms 44 A & B and the contractile actuators 41 (FIG. 10) can tilt a particular platform through a solid angle of approximately 90 degrees as illustrated in phantom for the top platform 44A in FIG. 12. Such tilting of the platform 44 is accomplished by relative contraction of the respective actuators articulating a particular platform. In the example illustrated in FIGS. 10, 12, 12A and 12B, contraction of a particular actuator tilts the particular platform in a plane determined by the positional relationship of the U-bolt receiving the eyelet fastener 64 of the particular actuator 41 and its coupling point 45 on the shank of the arm 43.

As illustrated in FIGS. 12A and 12B. The U-bolts 46 of the platform and coupling points 45 on the arm 43 are oriented in the same plane. It should be appreciated however, that the platform 44 can rotate relative to the arm 43 such that contraction of a particular actuator secured between its coupling point 45 on the arm 43 and the U-bolt 46 of the platform 44 provides a twisting or torque moment in addition to tilting the platform.

FIG. 13 schematically illustrates the relationship between fastening points 71 on a platform 72 and coupling points 73 on the shaft 74 of an embodiment of a pivoting mechanism 40 for three contractile actuators (not shown). Such fastening points 71 on the platform 72 and coupling points 73 on the shaft 74 for the platform 72 at the other end are rotated 60 degrees with respect to each other. Again, a cylindrical head indicated at 76 is received in a corresponding socket is (not shown) on the platform, and it should be realized that the platform 72 can be rotated such that a contracting actuator imparts a twisting as well as a tilting moment to the platform as it contracts.

Figure 14:
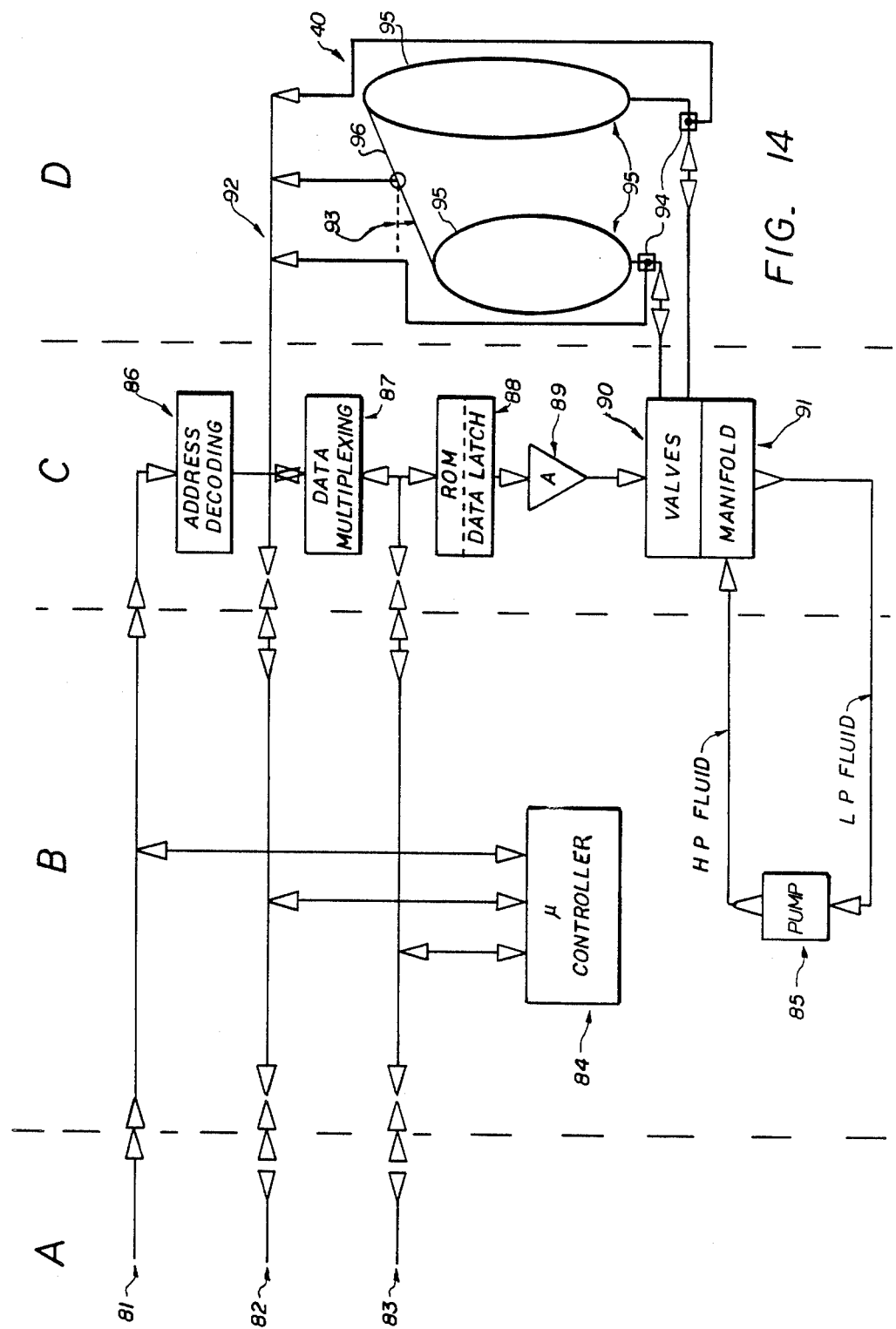
FIGS. 14 and 15 present block diagrams of an exemplary control system inflating and deflating contractility actuators for articulating the respective platforms at the distal ends of a pivoting mechanism of the type shown in FIG. 10.

Referring now to FIG. 14, a control system for controlling an articulating or pivoting mechanism 40 of the type depicted in FIG. 10, should include a master control system (section A) which may comprise a computer or other type of programmable data processor system. The master control system inputs commands and receives data via address bus 81, a data bus 82, and a control signal bus 83. The control system should also include a work station controller (section B) for implementing subprograms unique to particular articulating mechanisms for accomplishing such tasks as parts handling, tool manipulation, measurement and the like. The work station basically includes a micro-controller 84 which accepts commands from the master control and contains memory and microprograming for implementing device-level action. The work station should also include an energizing source such as pump 85 and manifold 91 for inflating the contractile actuators making up the system with a suitable high pressure liquid (water or hydraulic oil).

At the device level (section C) control processing is provided via an address decoder 86 for interpreting signals directed to a particular articulating mechanism, and a data multiplexing system for interpreting directional data coming from the micro-controller 84. A read only memory (ROM) and a data latch indicated at 88, the heart of the device level control processing subsystem, sets the sub-routines for opening and closing valves per instructions from either or both the master control and micro-controller 84 subsystems to inflate or deflate a particular articulating mechanism (section D).

In particular, an amplifier 89 receives and amplifies output signals from the ROM/data latch 88 opening and closing high speed valves 90: (i.) controlling flow of a liquid from the high pressure side of the manifold 91 into line(s) for inflating particular contractile actuator(s) inducing contraction and (ii.) controlling flow of the liquid from line(s) into the low pressure side of the manifold 91 for deflating particular contractile actuator(s) allowing extension.

At the articulating mechanism (section D), feedback signal generators 92 receiving input from pressure sensors 94 located between the valves 90 and the contractile actuators 95 and from one or more relative motion/displacement sensors 93 located on an articulating structure 96 provide data signals to both the master control and work station contol subsystems indicative of displacement relative to contraction and extension of the respective contractile actuators 95.

Figure 15:
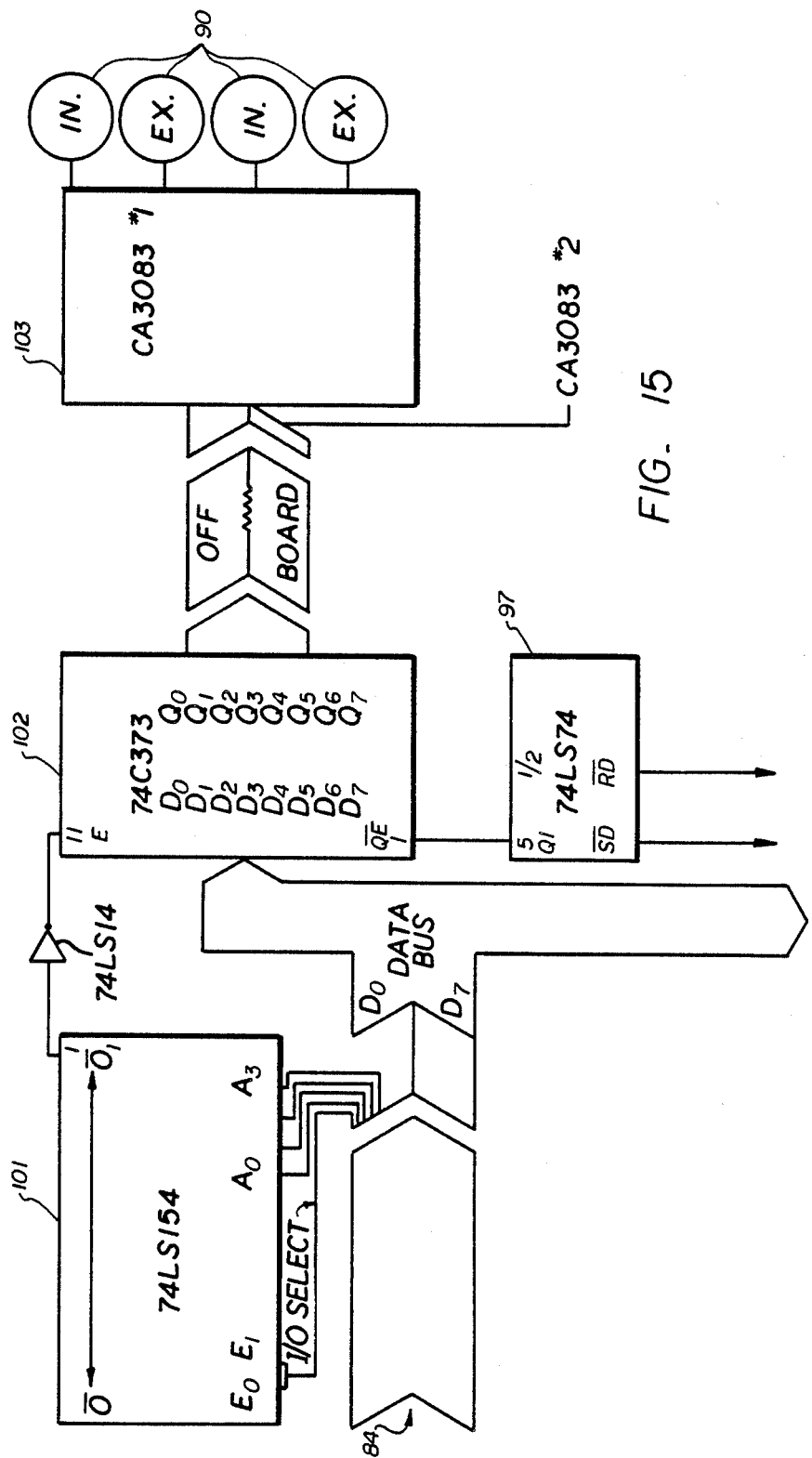

FIG. 15 presents a block diagram schematically illustrating a simple control circuit (FIG. 14, section C) for controlling two contractile actuators working in opposition including an address decoder 101, and a data latch 102. The data latch 102 receives input from the micro-controller 84, and the master control subsystems via a data bus (the address bus 81, data bus 82 and control signal bus 83 of FIG. 14) and a clocking pulse from a clock 97. The data latch 102 outputs signals directed for particular values. An amplifier 103 receives the output from the data latch 102 and amplifys it for switching (opening and closing) solenoid, diaphragm and/or shaped-memory-alloy actuated high speed valves 90. Suitable valves include Model 8225 made BY AUTOMATIC SWITCH VALVE CO. (ASCO) Florham Park, N.J., and Model Nos. EV2-12 and ETO-3 made by CLIPPARD Cincinnati, Ohio.

Although the preferred and exemplary embodiments of the invented liquid inflated contractility actuator and systems for utilizing same are described in context of representative, schematic, and computational embodiments, many variations and modifications of the invention including those suggested by the computational and schematic models utilized for describing and understanding the invention maybe made without departing from the scope of the invention as defined and set forth in the following claims

We claim:

1. A contractility actuator resisting a tensile force between two anchor points comprising in combination,
a cylindrical array connecting between the two anchor points formed by a network of open two dimensional quadrilateral segments provided by a plurality of closed loop strands composed of a relatively inextensible material helically woven into a cylindrical mesh sleeve wherein each closed loop strand encircles both the anchor points, the array having its axis aligned between the anchor points,
an expandable bladder located within the cylindrical network,
a liquid,
an input means for introducing precise volumes of the liquid into the bladder expanding the cylindrical array to generate contractile forces aligned with the axis of the array of increasing magnitude between the anchor points, and
output metering means for exhausting precise volumes of the liquid from the bladder allowing contraction of the cylindrical array responsive to the tensile force tending to separate the anchor points generating contractile forces aligned with the axis of the array of decreasing magnitude between the anchor points.

2. A contractility actuator resisting a tensile force between two anchor points for adjusting distance between the anchor points comprising in combination,
a cylindrical array connecting between the two anchor points formed by a network of open two dimensional quadrilateral segments provided by a plurality of closed loop strands composed of a relatively inextensible material helically woven into a cylindrical mesh sleeve wherein each closed loop strand encircles both the anchor points, the array having its axis aligned between the anchor points,
an expandable bladder located within the cylindrical network,
a liquid,
input means for introducing the liquid into the bladder expanding the cylindrical array incrementally shortening the distance between the anchor points, and
output metering means for exhausting precise volumes of the liquid from the bladder allowing contraction of the cylindrical array responsive to the tensile force tending to separate the anchor points incrementally lengthening the distance between the anchor points.

3. The contractility actuator of claim 1 or 2 and further including in combination therewith:
a longitudinal arm having a shank and a pivotable coupling on at least one of its two distal ends,
a platform secured to the pivotable coupling at a distal end of the arm,
a first shank anchoring means located on the shank of the arm providing one of the anchor points for securing one end of the cylindrical array,
a first platform anchoring means located on the platform providing the remaining anchor point for securing the remaining end of the cylindrical array.

4. The mechanism of claim 3 having at least a second set of two anchor points and at least a second contractility actuator including:
a second cylindrical array formed by a network of open two dimensional quadrilateral segments provided by a plurality of closed loop strands composed of a relatively inextensible material helically woven into a cylindrical mesh sleeve wherein each closed loop strand encircles the second set of two anchor points;
a second expandable bladder located within the second cylindrical array;
input means for introducing the liquid into the second bladder expanding the cylindrical array, incrementally shortening the distance between its anchor points;
output metering means for exhausting precise volumes of the liquid from the bladder allowing contraction of the cylindrical array responsive to a tensile force tending to separate its anchor points, incrementally lengthening the distance between the anchor points;

and wherein each additional set of two anchor points includes for each additional actuator:
- a shank anchoring means located on the shank of the arm in an opposite relationship relative to the first shank anchoring means providing an anchor point for securing one end of the second cylindrical array;
- a platform anchoring means located on the platform on the opposite side of the pivoting coupling relative to the first platform anchoring means providing an anchor point for securing the remaining end of the second cylindrical array, whereby each pair of actuators upon contraction tend to pivot the platform in different directions about a fulcrum provided by the pivotable coupling at the distal end of the arm; and
- a programmable control means for selectively controlling the input means and output metering means enabling the liquid to be simultaneously introduced into one bladder expanding one cylindrical array and exhausted from bladders within cylindrical arrays anchored to the platform across the fulcrum, the expanding cylindrical array providing the tensile force for contracting and extending the cylindrical arrays across the fulcrum.

5. The mechanism of claim 4 and further including:
- at least a second longitudinal arm having a shank and a pivotable coupling on at least one of its two distal ends,
- a pivoting member secured to the pivotable coupling at the distal end of the second arm,
- a plurality of shank anchoring means located in equal angular intervals around the shank of the second arm each providing an anchor point for securing one end of a cylindrical array,
- a plurality of pivoting member anchoring means located in equal angular intervals around the pivoting member each providing an anchor point for securing an end of a cylindrical array,
- means for coupling the platform at the distal end of the longitudinal arm to the pivoting member at the distal end of the second longitudinal arm;

and including:
- a first plurality of cylindrical arrays each formed by a network of open two dimensional quadrilateral segments provided by a plurality of closed loop strands composed of a relatively inextensible material helically woven into a cylindrical mesh sleeve wherein each closed loop strand encircles an anchor point on the shank of the second arm and an anchor point on the pivoting member
- an expandable bladder located within each cylindrical array of the first plurality of such arrays;
- input means for introducing the liquid into each bladder within the first plurality of cylindrical arrays whereby each cylindrical array of the first plurality can be expanded, incrementally shortening the distance between its anchor points;
- output metering means for exhausting precise volumes of the liquid from each bladder within the first plurality of cylindrical arrays whereby each cylindrical array of the first plurality can contract responsive to a tensile force tending to separate its anchor points, incrementally lenthening the distance between its anchor points;
- the programmable control means also selectively controlling the input means and output metering means for the bladders within the first plurality of cylindrical arrays whereby the platform and pivoting member can be pivoted independently.

6. An articulating mechanism comprising in combination,
- a first plurality of cylindrical arrays each formed by a network of open two dimensional quadrilateral segments, each array being adapted for connection between a set of two anchor points, and each having an axis aligned between its anchor points,
- an expandable bladder located within each cylindrical array,
- a liquid,
- a first longitudinal arm having a shank and a first spherical head on at least one of its two distal ends,
- a top platform having a hemispherical socket receiving and articulatable about the spherical head at the distal end of the arm,
- a plurality of lower shank anchoring means located in equal angular intervals around the shank of the arm each providing an anchor point for securing one end of a cylindrical array in the first plurality of such arrays,
- a plurality top platform anchoring means located in equal angular intervals around the top platform rotated about the longitudinal axis of the first arm relative to the lower shank anchoring means, each top platform anchoring means providing an anchor point for securing a remaining end of a cylindrical array in the first plurality of such arrays,
- input means for introducing the liquid into each bladder whereby each cylindrical arrays in the first plurality can be expanded generating a contractile force incrementally shortening the distance between its anchor points, and
- output metering means for exhausting precise volumes of the liquid from each bladder whereby each cylindrical array of the first plurality can be allowed to contract responsive to a tensile force tending to separate its anchor points incrementally lengthening the distance between its anchor points, and
- programmable control means for selectively controlling the input means and output metering means whereby the top platform may be simultaneously rotated about the longitudinal axis of the arm and articulated in a solid angle around the spherical head at the distal end of the arm.

7. The articulating mechanism of claim 6 and further including: a second plurality of cylindrical arrays each formed by a network of open two dimensional quadrilateral segments, each array being adapted for connection between a set of two anchor points, and each having an axis aligned between its anchor points,
- an expandable bladder located within each cylindrical array,
- a second spherical head on the remaining distal end of the longitudinal arm,
- a bottom platform having a hemispherical socket receiving and articulatable about the second spherical head at the distal end of the arm,
- a plurality of upper shank anchoring means located in equal angular intervals around the shank of the arm each providing an anchor point for securing one end of a cylindrical array in the second plurality of such arrays, a plurality bottom platform anchoring means located in equal angular intervals around the bottom platform rotated about the longitudinal axis of the first arm relative to the upper shank anchoring means, each bottom platform anchoring providing an anchor point for securing a remaining end of a cylindrical array in the second plurality of such arrays, input means for introducing the liquid into each bladder within the second plurality of cylindrical arrays whereby each cylindrical array in the second plurality can be expanded generating a contractile force incrementally shortening the distance between its anchor points, and output metering means for exhausting precise volumes of the liquid from each bladder within the second plurality of cylindrical arrays whereby each cylindrical array of the second plurality can be allowed to contract responsive to a tensile force tending to separate its anchor points incrementally lengthening the distance between its anchor points, the programmable control means also providing selective control of the input means and output metering means for the bladders within the second plurality of cylindrical arrays, whereby a modular articulation unit is provided having top and bottom platforms separated by a longitudinal arm, each of which may be simultaneously rotated about the longitudinal axis of the arm and articulated in a solid angle around its respective spherical head at the distal ends of the arms independently.

8. The articulating mechanism of claim 6 or 7 wherein the input means include:

a high pressure manifold containing the liquid, conduit means for establishing liquid communication between the manifold and each bladder in the respective cylindrical arrays, and pump means for pressurizing the liquid in the high pressure manifold sufficiently to establish liquid flow from the manifold to each bladder, the programmable control means providing electrical signals for opening the normally closed valve means for precise intervals.

9. The articulating mechanism of claim 7 further including an output metering means comprising in combination therewith:

a low pressure reservoir for receiving the liquid, conduit means for establishing liquid communication between the low pressure reservoir and each bladder within the respective cylindrical arrays, a plurality of electrically energized, normally closed valve means each for interrupting liquid flow from one bladder to the low pressure reservoir, the pump means pumping the liquid from the low pressure reservoir into the high pressure manifold, the programmable control means providing electrical signals for opening the normally closed valve means for precise intervals.

10. The articulating mechanism of claim 9 wherein the electrically energized, normally closed valve means comprise high speed solenoid actuated valves interconnected serially into the respective conduit means establishing liquid communication between each bladder and the respective manifold and reservoir.

11. The articulating mechanism of claim 9 wherein the electrically energized, normally closed valve means comprise high speed diaphragm actuated valves interconnected serially into the respective conduit means establishing liquid communication between each bladder and the respective manifold and reservoir.

12. The articulating mechanism of claim 9 wherein the electrically energized, normally closed valve means comprise high speed shaped alloy valves interconnected serially into the respective conduit means establishing liquid communication between each bladder and the respective manifold and reservoir.

13. The articulating mechanism of claim 9 wherein the programmable control means for selectively controlling the electrically energized, normally closed valve means includes: (FIG. 15)

a programmable master control subsystem for encoding articulation instructions into digital instruction signals, a micro-controller subsystem receiving and interpreting instruction signals from the master control subsystem for generating digital action signals expressing an algorithm describing desired response parameters for at least two cylindrical arrays oriented and anchored for pivoting the particular platform in opposite directions and the respective normally closed valve means for such arrays a data bus receiving both instruction and action signals from the master control and microcontroller subsystems, a clock means for generating a clocking signal, an address decoder receiving action signals from the micro-controller subsystem, a data latch receiving the digital instruction and action signals from the data bus and the clocking signal from the clocking means for directing output digital signals to particular normally closed valve means, an amplifier for each normally closed valve means receiving the output digital signals directed to the particular valve means by the data latch for supplying an energizing electrical signal to the particular valve means causing the valve means to open for periods corresponding to the output digital pulses received.

14. The articulating mechanism of claim 9 wherein the programmable control means for selectively controlling the electrically energized, normally closed valve means includes: (FIG. 14)

a programmable data processor (computer) means for inputting commands and receiving data, a work station controller (micro-controller) means for implementing subprograms uniquely tailored to the articulating mechanism, feedback signal generator means receiving input from pressure sensors located between the normally closed valves means and the bladders and from motion/displacement sensors located on the articulating top and bottom platforms for providing data signals to both the computer means and micro-controller means indicative of displacement relative to contraction and extension of the respective cylindrical arrays, and a control processing means including:
an address decoder for interpreting signals directed to particular cylindrical arrays,
a data multiplexing system for directing directional data coming from the micro-controller, and the feedback signal generator means,
a read only memory (ROM) and
a data latch, for
- (i) controlling flow of a liquid for the high pressure side of the manifold for inflating particular bladders inducing contraction of the associated cylindrical array and
- (ii) controlling flow of the liquid from particular bladders into the low pressure reservoir allowing extension of the associated cylindrical arrays, an address bus, a data bus and a control signal bus interconnecting between the programmable data processor (computer) means, the work station controller (micro-controller) means, the control processing means, and the feedback signal generator means.

15. The modular articulation unit of claim 7 wherein the respective top and bottom platforms include interconnecting means for securing each to a respective bottom and top platform of a second such modular articulation unit.

16. The modular articulation unit of claim 7 wherein at least one of the platforms includes a second hemispherical socket receiving and articulatable about a first spherical head at a distal end of a second longitudinal arm and further including:
- a third plurality of cylindrical arrays each formed by a network of open two dimensional quadrilateral segments provided by a plurality of closed loop strands composed of a relatively inextensible material helically woven into a cylindrical mesh sleeve wherein each closed loop strand encircles a set of two anchor points, and each array having an axis aligned between its anchor points,
- an expandable bladder located within each cylindrical array of the third plurality,
- a plurality of upper shank anchoring means located in equal angular intervals around the shank of the second arm each providing an anchor point for securing one end of a cylindrical array in the third plurality of such arrays,
- a second plurality of platform anchoring means located in equal angular intervals around the platform each providing an anchor point for securing a remaining end of a cylindrical array in the third plurality of such arrays,
- input means for introducing the liquid into each bladder within the third plurality of cylindrical arrays whereby each cylindrical array in the third plurality can be expanded generating a contractile force incrementally shortening the distance between its anchor points, and
- output metering means for exhausting precise volumes of the liquid from each bladder within the third plurality of cylindrical arrays, whereby each cylindrical array of the third plurality can be allowed to contract responsive to a tensile force tending to separate its anchor points incrementally lengthening the distance between its anchor points, the programmable control means also providing selective control of the input means and output metering means for the bladders within the third plurality of cylindrical arrays whereby the second longitudinal arm can be articulated in a solid angle relative to the second hemispherical socket of the particular platform independently of articulation of the respective top and bottom platforms at the distal ends of the first longitudinal arm.

17. The modular articulation unit of claim 16 and:
- a second spherical head on the remaining distal end of the second longitudinal arm,
- a third platform having a hemispherical socket receiving and articulatable about the second spherical head on the remaining distal end of the second longitudinal arm,
- a fourth plurality of cylindrical arrays each formed by a network of open two dimensional quadrilateral segments provided by a plurality of closed loop strands composed of a relatively inextensible material helically woven into a cylindrical mesh sleeve wherein each closed loop strand encircles a set of two anchor points, and each having an axis aligned between its anchor points,
- an expandable bladder located within each cylindrical array of the fourth plurality,
- a plurality of lower shank anchoring means located in equal angular intervals around the shank of the second arm each providing an anchor point for securing one end of a cylindrical array in the fourth plurality of such arrays,
- a plurality of platform anchoring means located in equal angular intervals around the third platform each providing an anchor point for securing a remaining end of a cylindrical array in the fourth plurality of such arrays,
- input means for introducing the liquid into each bladder within the fourth plurality of cylindrical arrays whereby each cylindrical array in the fourth plurality can be expanded generating a contractile force incrementally shortening the distance between its anchor points, and
- output metering means for exhausting precise volumes of the liquid from each bladder within the fourth plurality of cylindrical arrays whereby each cylindrical array of the fourth plurality can be allowed to contract responsive to a tensile force tending to separate its anchor points incrementally lenthening the distance between its anchor points, the programmable control means also providing selective control of the input means and output metering means for the bladders within the fourth plurality of cylindrical arrays whereby the third platform at the distal end of the second longitudinal arm can be articulated in a solid angle relative to the second spherical head of the second arm independently of articulation of the respective top and bottom platforms at the distal ends of the first longitudinal arm and articulation of the second longitudinal arm.

18. The mechanism of claim 6 further wherein the network of open two dimensional quadrilateral segments of the cylindrical array are provided by a plurality of closed loop strands composed of a relatively inextensible material helically woven into a cylindrical mesh sleeve and wherein each closed loop strand encircles both the shank and the platform anchoring means.

19. The mechanism of claim 18 wherein the input and output metering means introduce and exhaust liquid from the bladder via a common conduit communicating through the shank of the arm and through the first shank anchoring means.

20. The mechanism of claim 19 wherein the first shank anchoring means comprises in combination:
- a cylindrical collar having a coaxial passageway, raised exterior annular shoulders at each distal end, having a port communicating radially from the passageway to the exterior cylindrical surface of the collar at a point located centrally between its distal ends, the closed loop strands at one end of the of the cylindrical mesh sleeve encircling the exterior of the collar between its raised annular shoulder, a structural protrusion extending outwardly from the shank of the arm having an axial conduit communicating from the arm to a radial port drilled into the protrusion and a raised annular shoulder adjacent to the arm, the protrusion being received in the coaxial passageway through the collar for securing that particular end of the cylindrical mesh sleeve, a tube hermetically received in the port through the collar establishing liquid communication with the bladder, means for establishing a liquid tight seal between the raised annular shoulder of the protrusion and the distal end of the collar adjacent thereto, and between the protrusion and the collar in a region proximate the remaining distal end of the collar, whereby a liquid flow path is provided by the conduit through the arm the axial conduit of the protrusion, out the port terminating the axial conduit, and the tube to the bladder.

21. The mechanism of claim 18 wherein the first platform anchoring means provides an articulating anchor for securing one end of the cylindrical mesh sleeve to the platform.

22. The mechanism of claim 21 wherein the articulating anchor includes a toroidal sleeve encircled by the closed loop strands at one end of the of the cylindrical mesh, and a U-shaped bale depending from the platform threading the toroidal sleeve.

23. The articulating mechanism of claim 6 wherein at least one of the cylindrical arrays is secured between a lower shank anchoring means and a top platform anchoring means for rotating the platform relative to the shank in a first direction and the remaining cylindrical arrays are secured between the remaining lower shank and top platform anchoring means for rotating the platform relative to the shank in an opposite direction to the first direction.

24. The articulating mechanism of claim 23 having at least three cylindrical arrays, whereby the anchor points of the arrays secured to the top platform define a plane.

25. An articulating mechanism comprising in combination, a first contractility actuator having an inelastic contractile response including:

a cylindrical array connecting between two anchor points formed by a network of open two dimensional quadrilateral segments, having its axis aligned between the anchor points, an expandable bladder located within the cylindrical network, a liquid, an input metering means for introducing precise volumes of the liquid into the bladder expanding the cylindrical array to generate contractile forces aligned with the axis of the array of increasing magnitude between the anchor points, and output metering means for exhausting precise volumes of the liquid from the bladder allowing contraction of the cylindrical array responsive to the tensile force tending to separate the anchor points generating contractile forces aligned with the axis of the array of decreasing magnitude between the anchor points, a longitudinal arm having a shank and a pivotable coupling on at least one of its two distal ends, a platform secured to the pivotable coupling at the distal end of the arm, a first shank anchoring means located on the shank of the arm providing one of the anchor points for securing one end of the cylindrical array, a first platform anchoring means located on the platform providing the remaining anchor point for securing the remaining end of the cylindrical array and a second contractility actuator having an elastic contractile response including:

a second cylindrical array formed by a network of open two dimensional quadrilateral segments and having ends for connection between a second set of two anchor points, a second shank anchoring means located on the shank of the arm in an opposite relationship relative to the first shank anchoring means providing an anchor point for securing one end of the second cylindrical array, a second platform anchoring means located on the platform on the opposite side of the pivoting coupling relative to the first platform anchoring means providing an anchor point for securing the remaining end of the second cylindrical array, a second expandable bladder located within the second cylindrical array, a gas, input means for pressurizing the second bladder with the gas expanding the second cylindrical array generating an elastic contractile force tending to pivot the first set of anchor points apart.

* * * * *